Jan. 9, 1951 F. BURRI 2,537,441
LUGGAGE CARRIER FOR VEHICLES
Filed Dec. 20, 1947 2 Sheets-Sheet 1

INVENTOR:
FRITZ BURRI.
BY K. A. Mayr
ATTORNEY

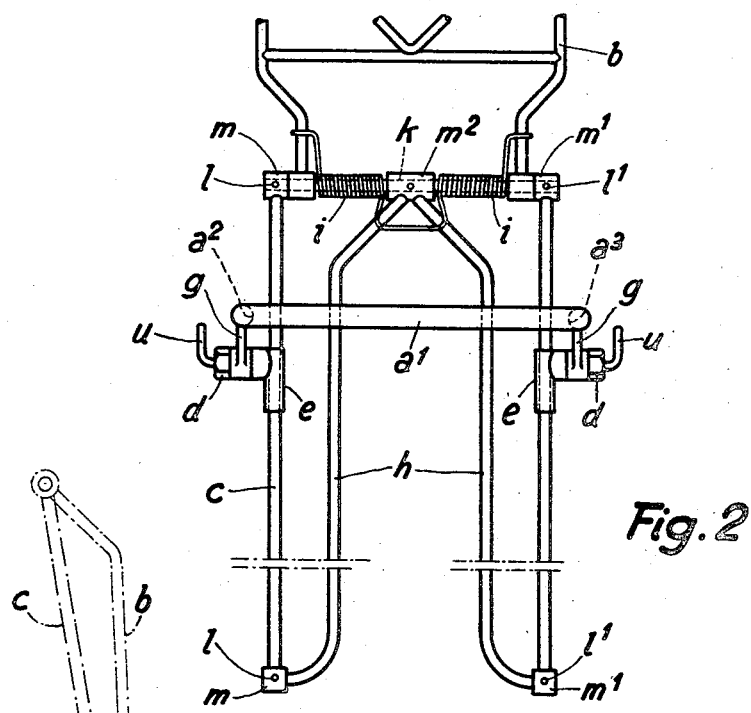
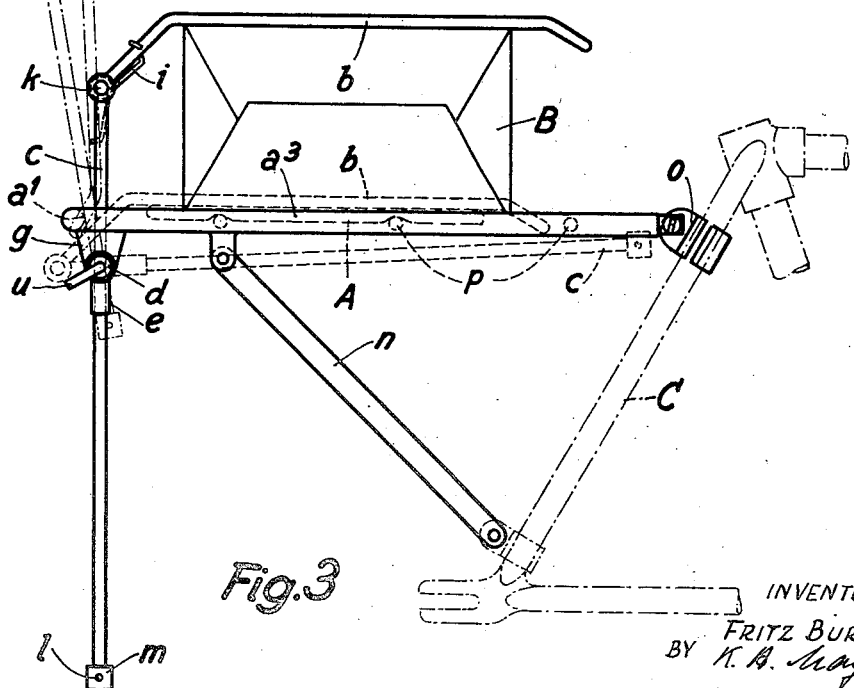

Patented Jan. 9, 1951

2,537,441

UNITED STATES PATENT OFFICE 2,537,441

LUGGAGE CARRIER FOR VEHICLES

Fritz Burri, Bienne, Switzerland, assignor, by direct and mesne assignments, of one-half to Charles Moser, Bienne, and one-half to Joseph Dionisotti, Monthey, Switzerland Application December 20, 1947, Serial No. 792,979
In Switzerland November 27, 1944

Section 1, Public Law 690, August 8, 1946
Patent expires November 27, 1964

3 Claims. (Cl. 224—32)

Object of the invention is a luggage carrier for vehicles, such as bicycles, motor cycles, and auto cars. It is characterized in that the clamping stirrup is mounted on a slide adjustably fixed to the carrier frame, so that the slide can be adjusted to correspond with the height of the piece to be held, in order to have the clamping stirrup applied over its whole length on the piece to be held.

The accompanying drawings illustrate, by way of example, one embodiment of the object of invention.

Fig. 2 is a rear view with the slide partly drawn out and turned behind;

Fig. 3 is a side view of the luggage carrier with the slide partly drawn out and the clamping stirrup in its normal position with bearing eyes on the rear part of the frame;

Figure 1:
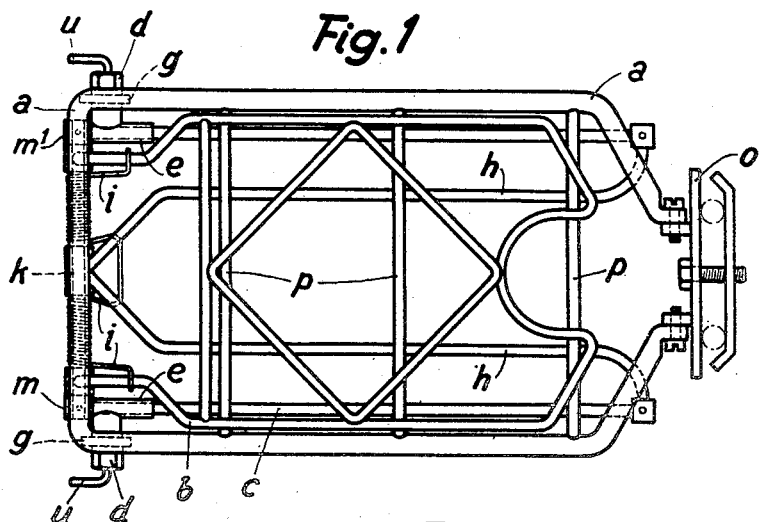
Fig. 1 is a plan view of the luggage carrier with slide and clamping stirrup.
Figure 4:
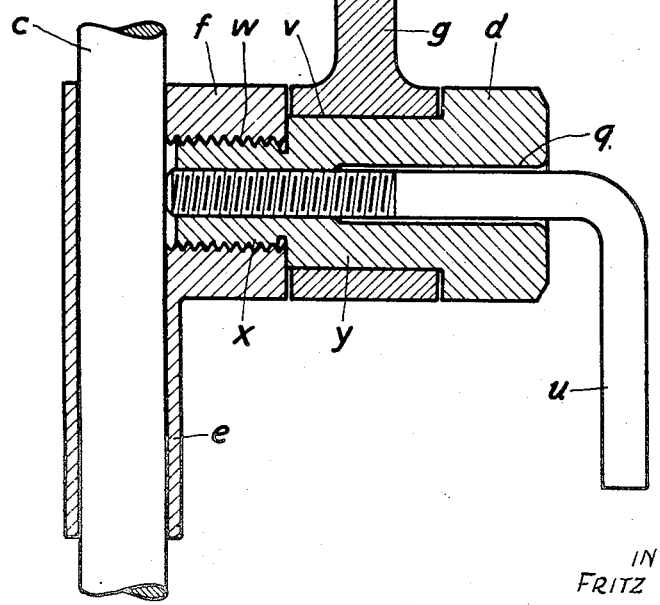
Fig. 4 shows a detail of Fig. 2 but on a larger scale.

The frame $a$ of the luggage carrier is made of tubes and has struts $n$ for its support on the frame C of a vehicle, e. g. of a bicycle. It is detachably fixed by means of a clamping device $o$, e. g. to the frame tubes extending from the rear axle of the bicycle to the seat pillar. Bearing bars $p$ are provided on the frame $a$ to form a grate together with a cross bar $a^1$ and longitudinal rods $a^2$, $a^3$. The clamping stirrup $b$ formed as a framework is pivotably fixed (as set forth hereinafter) to a slide $c$ mounted on the carrier frame $a$. Bearing eyes $g$ are welded to the rear part of the longitudinal rods $a^2$, $a^3$ of the frame $a$, on which the slide $c$ is adjustably and revolvably mounted in a manner especially shown in Fig. 4. The eye $g$ has a bore $v$ with its axis perpendicular to the longitudinal axis of the frame $a$. The slide $c$ is slidably mounted on an angular guide piece $e$, the shorter leg $f$ of which has its front face in contact with the eye $g$. This leg $f$ has a bore $w$ with inside thread. The diameter of this bore $w$ is smaller than that of bore $v$. The inside thread of bore $w$ cooperates with the bolt $d$ of a screw which forms a carrier for the slide $c$. Between the screw head $x$ and the head portion of the bolt $d$ there is a threadless part $y$, the diameter of which is equal to that of the bore $v$. The length of the part $y$ and of the bolt $d$ are chosen so that the bolt $d$ does not enter into contact with the slide $c$ when the screw $x$ is entirely screwed in, i. e. when the guide pieces $e$, $f$ and the bolts $d$ are closely pressed together. Screw $x$ has a through-hole $q$ with threads on the side of the bolt $d$. These threads cooperate with a locking member $u$ extending through the hole $q$, which, when completely screwed in, presses upon the slide $c$ for locking the latter against movement along the guide $e$. In spite of this, the slide $c$ remains pivotable. This slide is formed as a frame open at its one end, comprising reinforcement bars $h$, the ends of which are connected with tubular pieces $m$ and $m_1$ fixed by conical pins $l$ and $l_1$. The closed end of the slide forms the revolving axle for the clamping stirrup $b$. Upper tubular pieces $m$, $m^1$ and a similar tubular piece $m^2$ connect this axle with the longitudinal members $c$ and the reinforcement bars, respectively. A spring $i$ acting upon the clamping stirrup $b$ is supported on the reinforcement bars $h$ of the slide $c$.

The luggage carrier works and is handled as follows:

In rest position (represented by the dotted lines in Fig. 3), the clamping stirrup and the slide are turned into the plane of the frame $a$. The slide $c$ is locked by the member $u$. In this position, small parcels A or other small pieces can be placed on the grate after simply turning the clamping stirrup $b$ upwards and towards the rear. They are held when the clamping stirrup $b$ is abandoned to the action of spring $i$. The open end of the slide $c$ rests from below on a bearing bar $p$ of the carriage frame. If a larger piece is to be held, the open end of the slide $c$ is turned with one hand rearwards and downwards. After having been unlocked, the clamping stirrup together with the slide is displaced with the other hand in the guide $e$, $f$ until the distance of the horizontally positioned clamping stirrup corresponds to the height of the parcel B, so that the slide $c$ can be applied to cross bar $a^1$ of the carriage frame which then forms the stop or abutment hereabove mentioned, whilst the stirrup is applied to the parcel over the whole length, i. e. not only along an edge as was hitherto the case. This position is shown in solid lines in Fig. 3. The slide $c$ is applied to the cross bar $a^1$ of the carriage frame. The luggage carrier shown can be converted into a children's seat. For this purpose, the slide together with the clamping stirrup is merely lifted until the lower tubular parts $m$, $m^1$ abut on the angular pieces $e$, $f$ and the clamping stirrup is abandoned to the action of spring $i$ so that it abuts on the front side of the slide. In this position (shown in dot-and-dash lines in Fig. 3), the slide is locked against shifting by means of the locking member $u$.

The luggage carrier as illustrated can be used both for bicycles and motor cycles. For use in auto cars, two carriers such as illustrated are placed side by side, each of them possessing a separate clamping stirrup mounted on a separate slide. The slides have, however, a common revolving axle for the clamping stirrup, so that these slides can be shifted together while the stirrups are to be operated individually.

Having now particularly described and ascertained the nature of my said invention and in what manner the same is to be performed, I declare that what I claim is:

1. In a luggage carrier for vehicles, such as bicycles and motorcycles, a carrier frame having two longitudinal rods extending in a substantially horizontal plane, bearing bars of which at least one interconnects said longitudinal rods, means for securing said carrier frame to a vehicle, a substantially U-shaped slide fixed to said longitudinal rods at the hind end thereof with allowance for shifting and swinging, a clamping stirrup pivotally mounted to the middle portion of said slide, torsion spring means engaging said slide and said clamping stirrup, locking means for locking said slide against shifting while leaving it free for swinging, and abutment means rigidly fixed to said carrier frame in such a disposition with regard to the swinging axis of said slide as to permit said slide to be swung and shifted from a position of said middle portion beside the swinging axis of the slide into a position where said slide is locked by means of said locking means and in which said slide stands substantially parallel to a vertical plane and rests against said abutment means.

2. In a luggage carrier according to claim 1, said slide comprising longitudinal members, eyes rigidly fixed to said longitudinal rods, having each a bore coaxial to the swinging axis of said slide, bolts having each a cylindrical portion fitting one of said bores with allowance of rotary movement thereof, the length of said cylindrical portion being slightly superior to that of the bore which it fits, a head portion with a circumference larger than that of said cylindrical portion and located on the outside of the adjacent eye, an externally threaded portion with an outer diameter inferior to that of said cylindrical portion and located on the inside of the adjacent eye, a threaded hole coaxial to said cylindrical portion, angular guide pieces each having two bores perpendicular to each other, one of which has an internal thread and fits the externally threaded portion of one of said bolts, whilst the other of said bores is threadless and fits slidably one of said longitudinal members, locking members constituting said locking means, each having an externally threaded portion engaging the threaded hole of one of said bolts, and a handle portion, and a cross bar interconnecting the hind ends of said longitudinal rods and constituting said abutment means.

3. In a luggage carrier according to claim 1, said slide comprising two outer longitudinal members, an axle interconnecting the one ends of said longitudinal members, and reinforcement bars parallel to each other and to the longitudinal members along a portion of their length, interconnecting the other ends of said longitudinal members with the middle part of said axle, said clamping stirrup being pivotally mounted on said axle, eyes rigidly fixed to said longitudinal rods, having each a bore coaxial to the swinging axis of said slide, bolts having each a cylindrical portion fitting one of said bores with allowance of rotary movement thereof, the length of said cylindrical portion being slightly superior to that of the bore which it fits, a head portion with a circumference larger than that of said cylindrical portion and located on the outside of the adjacent eye, an externally threaded portion with an outer diameter inferior to that of said cylindrical portion and located on the inside of the adjacent eye, a threaded hole coaxial to said cylindrical portion, angular guide pieces each having two bores perpendicular to each other, one of which has an internal thread and fits the externally threaded portion of one of said bolts, whilst the other of said bores is threadless and fits slidably one of said longitudinal members, locking members constituting said locking means, each having an externally threaded portion engaging the threaded hole of one of said bolts, and a handle portion, and a cross bar interconnecting the hind ends of said longitudinal rods and constituting said abutment means.

FRITZ BURRI.

REFERENCES CITED

The following references are of record in the file of this patent:

UNITED STATES PATENTS

| Number | Name | Date |
|---|---|---|
| 1,044,867 | De Brenil | Nov. 19, 1912 |
| 1,900,070 | Murphy | Mar. 7, 1933 |

FOREIGN PATENTS

| Number | Country | Date |
|---|---|---|
| 37,348 | Netherlands | Jan. 15, 1936 |
| 90,391 | Sweden | Sept. 28, 1937 |
| 102,739 | Sweden | Oct. 7, 1941 |
| 230,006 | Switzerland | May 1, 1944 |
| 504,906 | Great Britain | May 2, 1939 |
| 650,122 | Germany | Sept. 11, 1937 |